US009612964B2

(12) United States Patent
Islam et al.

(10) Patent No.: US 9,612,964 B2
(45) Date of Patent: Apr. 4, 2017

(54) MULTI-TIER FILE STORAGE MANAGEMENT USING FILE ACCESS AND CACHE PROFILE INFORMATION

(71) Applicant: International Business Machines Corporation, Armonk, NY (US)

(72) Inventors: Shah M. R. Islam, Tucson, AZ (US); John T. Olson, Tucson, AZ (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 14/326,420

(22) Filed: Jul. 8, 2014

(65) Prior Publication Data
US 2016/0011979 A1  Jan. 14, 2016

(51) Int. Cl.
*G06F 12/08* (2016.01)
*G06F 3/06* (2006.01)
(Continued)

(52) U.S. Cl.
CPC .......... *G06F 12/0871* (2013.01); *G06F 3/061* (2013.01); *G06F 3/0631* (2013.01);
(Continued)

(58) Field of Classification Search
CPC ......... G06F 17/30082; G06F 17/30575; G06F 17/30867; G06F 3/067; G06F 17/302; G06F 3/0604; G06F 3/0655; G06F 12/0868; G06F 17/30705; G06F 2212/1044; G06F 3/0608; G06F 3/064; G06F 3/0647; G06F 3/0685; G06F 12/0871; G06F 17/30132; G06F 17/30699; G06F 2003/0691; G06F 2212/1016; G06F 2212/202; G06F 2212/214; G06F 2212/222; G06F 2212/261;
(Continued)

(56) References Cited

U.S. PATENT DOCUMENTS

| 6,032,224 | A | 2/2000 | Blumenau |
| 6,658,434 | B1 * | 12/2003 | Watanabe ........... G06F 11/1464 |
| 6,665,869 | B1 * | 12/2003 | Ellis ..................... H04N 5/4401 |
| | | | 348/E5.103 |
| 6,735,568 | B1 | 5/2004 | Buckwalter et al. |
| 6,745,295 | B2 | 6/2004 | Rodriguez |
| 6,748,487 | B1 * | 6/2004 | Takamoto ........... G06F 12/0866 |
| | | | 711/112 |
| 7,441,096 | B2 | 10/2008 | Kitamura |
| 7,730,531 | B2 | 6/2010 | Walsh |
| 7,930,485 | B2 | 4/2011 | Fertig et al. |
| 7,945,733 | B2 | 5/2011 | Jagadish et al. |
| 8,176,258 | B2 | 5/2012 | Wang |
| 2005/0246386 | A1 | 11/2005 | Sullivan et al. |
| 2006/0143400 | A1 | 6/2006 | Steely |
| 2010/0199036 | A1 * | 8/2010 | Siewert ................. G06F 3/0613 |
| | | | 711/112 |
| 2013/0151777 | A1 | 6/2013 | Daly et al. |
| 2013/0166831 | A1 | 6/2013 | Atkisson et al. |
| 2013/0305317 | A1 * | 11/2013 | Umamaheswaran  H04L 63/0815 |
| | | | 726/4 |
| 2014/0082288 | A1 * | 3/2014 | Beard ................ G06F 17/30132 |
| | | | 711/123 |

(Continued)

FOREIGN PATENT DOCUMENTS

CN  WO 2013075341 A1 *  5/2013  ........... G06F 12/122
WO  WO2013075341  5/2013

*Primary Examiner* — Mark Giardino, Jr.
*Assistant Examiner* — Edward Waddy, Jr.
(74) *Attorney, Agent, or Firm* — Zilka-Kotab, PC

(57) ABSTRACT

In one embodiment, a method for managing data includes determining that a cache access count for a given data block is greater than an average cache access count, receiving a list of active applications accessing the given data block with an anticipated access count for each active application, receiving a list of applications that are anticipated to access the given data block within a time window with an anticipated future access count for each anticipated application, determining that a block application access weight is greater than a block application access threshold, determining that a cache profile weight for the given data block is greater than zero, and sending the cache profile weight to a file system. Other systems, methods, and computer program products are described according to more embodiments.

20 Claims, 10 Drawing Sheets

(51) Int. Cl.
*G06F 12/0871* (2016.01)
*G06F 12/0893* (2016.01)
*G06F 11/00* (2006.01)

(52) U.S. Cl.
CPC ............ G06F 3/0685 (2013.01); G06F 11/00 (2013.01); G06F 12/0893 (2013.01); *G06F 2003/0691* (2013.01); *G06F 2003/0692* (2013.01); *G06F 2212/1044* (2013.01)

(58) Field of Classification Search
CPC ......... G06F 2212/281; G06F 2212/461; G06F 2212/604; G06F 3/061; G06F 3/0611; G06F 3/0632; G06F 3/0643; G06F 3/0653; G06F 3/0656; G06F 9/5016
USPC ......... 711/112, E12.002, E12.019, 102, 108, 711/111
See application file for complete search history.

(56) References Cited

U.S. PATENT DOCUMENTS

2014/0304480 A1* 10/2014 Tang ....................... G06F 11/00
   711/146

* cited by examiner

| Step | Access Block | Cache Action | Cache State (X an initial) | Multi-Tier Monitoring Module View |
|---|---|---|---|---|
| 1 | A | Cache Miss A | X,X→A,X | Read A |
| 2 | A | Cache Hit A | A,X | -- |
| 3 | B | Cache Miss B | A,X→A,B | Read B |
| 4 | A | Cache Hit B | A,B | -- |
| 5 | A | Cache Hit A | A,B | -- |
| 6 | C | Cache Miss C, Evict B | A,B→A,C | Write B, Read C |
| 7 | A | Cache Hit A | A,C | -- |
| 8 | A | Cache Hit A | A,C | -- |
| 9 | B | Cache Miss B, Evict C | A,C→A,B | Write C, Read B |
| 10 | A | Cache Hit A | A,B | -- |
| 11 | A | Cache Hit A | A,B | -- |
| 12 | C | Cache Miss C, Evict B | A,B→A,C | Write B, Read C |
| 13 | D | Cache Miss D, Evict A | A,C→D,C | Write A, Read D |
| 14 | E | Cache Miss E, Evict C | D,C→D,E | Write C, Read E |

FIG. 10

MULTI-TIER FILE STORAGE MANAGEMENT USING FILE ACCESS AND CACHE PROFILE INFORMATION

BACKGROUND

The present invention relates to management of a multi-tier storage environment, and more specifically, this invention relates to efficient management of high performance tiers in a multi-tier storage environment.

A file system defines how files are named and manages how they are placed for storage and retrieval. File system functionality may be divided into two components: a user component and a storage component. The user component is responsible for managing files within directories, file path traversals, and user access to files. The storage component of the file system determines how files are stored physically on the storage device.

File blocks are mapped to logical blocks, which are then mapped onto actual physical blocks on storage media. A logical to physical mapping layer is used to make file management independent of storage management. A file system 102 is shown in FIG. 1, where File 1 has two file blocks 112: FBlock 0 (FB0) and Fblock 1 (FB1). FB0 and FB1 for File 1 are mapped to two logical blocks 110: LBlock 0 and LBlock 1. LBlock 0 and LBlock 1 are mapped to actual physical blocks 108 (Block 0 and Block 10) on the storage medium 104. For File 2, file blocks 112 FB0, FB1, and FB2 are mapped to LBlock 2, LBlock 3, and LBlock 4, which are mapped to actual physical blocks 108 (Block 30, Block 50, and Block 60) on the storage medium 104. Since storage medium 104 (such as hard disk drive (HDD), magnetic tape, etc.) accesses are slower, data blocks are stored to the in-memory cache 106 for quicker access. On a first read operation, data is copied from the storage medium 104 to the in-memory cache 106, in an action referred to as a "Cache Miss." Subsequent accesses on the block are performed from the in-memory cache 106 once the desired data is stored therein. Blocks from the in-memory cache 106 are written to the storage medium 104 in either of two scenarios: 1) in-memory cache 106 space is limited, so when new blocks are to be stored to the in-memory cache 106, old blocks are evicted from the in-memory cache 106 and stored on the storage medium 104 in an action referred to as a "Cache Eviction:" and 2) when an application explicitly commands the in-memory cache 106 to flush data to the storage medium 104.

Multi-tiered storage is a storage method where data is stored on various types of storage devices primarily based on criteria of the access, frequency of use, security, and/or data recovery requirements. For example, data that is frequently accessed by an application that is response time sensitive might be stored on a solid state drive (SSD). Other data that is infrequently accessed and for which a higher response time is more tolerable might be stored on high capacity 7200 RPM HDDs. The cost per Gigabyte of storage is much higher for SSDs than it is for the 7200 RPM HDDs. One challenge in effectively using multi-tiered storage is identifying the data that benefits from the higher cost/higher performance storage tiers. Over time, the optimal tier for a given piece of data may change; thus, the identification and movement of data to an appropriate tier is an ongoing and evolving process.

Since SSDs are costlier than HDDs, preferred solutions allow for dynamic relocation of data across tiers based on the data usage by placing "hot" data with high I/O density and low response time requirements on SSDs while targeting HDDs or other slower-responding data storage devices for "cooler" data that is accessed more sequentially and/or at lower rates.

BRIEF SUMMARY

In one embodiment, a method for managing data includes determining that a cache access count for a given data block is greater than an average cache access count for a plurality of data blocks, receiving a list of active applications accessing the given data block with an anticipated access count for each active application contingent upon the cache access count being greater than the average cache access count, receiving a list of applications that are anticipated to access the given data block within a time window with an anticipated future access count for each anticipated application contingent upon the cache access count being greater than the average cache access count, determining that a block application access weight is greater than a block application access threshold contingent upon the cache access count being greater than the average cache access count, determining that a cache profile weight for the given data block is greater than zero contingent upon the block application access weight being greater than the block application access threshold, and sending the cache profile weight to a file system contingent upon the cache profile weight being greater than zero.

In another embodiment, a system includes a processor and logic integrated with and/or executable by the processor, the logic being configured to determine a cache profile weight for a given data block upon receiving a request to evict the given data block from cache, and determine a storage tier to store the given data block based on at least one of: an extent cache profile weight of an extent including the given data block, and a heat count for the given data block.

In yet another embodiment, a computer program product for managing data includes a computer readable storage medium having program code embodied therewith, the program code being readable and/or executable by a processor to cause the processor to determine, by the processor, that a cache access count for a given data block is greater than an average cache access count for a plurality of data blocks, receive, by the processor, a list of active applications accessing the given data block with an anticipated access count for each active application contingent upon the cache access count being greater than the average cache access count, receive, by the processor, a list of applications that are anticipated to access the given data block within a time window with an anticipated future access count for each anticipated application contingent upon the cache access count being greater than the average cache access count, determine, by the processor, that a block application access weight is greater than a block application access threshold contingent upon the cache access count being greater than the average cache access count, determine, by the processor, that a cache profile weight for the given data block is greater than zero contingent upon the block application access weight being greater than the block application access threshold, and send, by the processor, the cache profile weight to a file system contingent upon the cache profile weight being greater than zero.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 10 is a flowchart of a method for managing data according to one embodiment.

DETAILED DESCRIPTION

Figure 1:
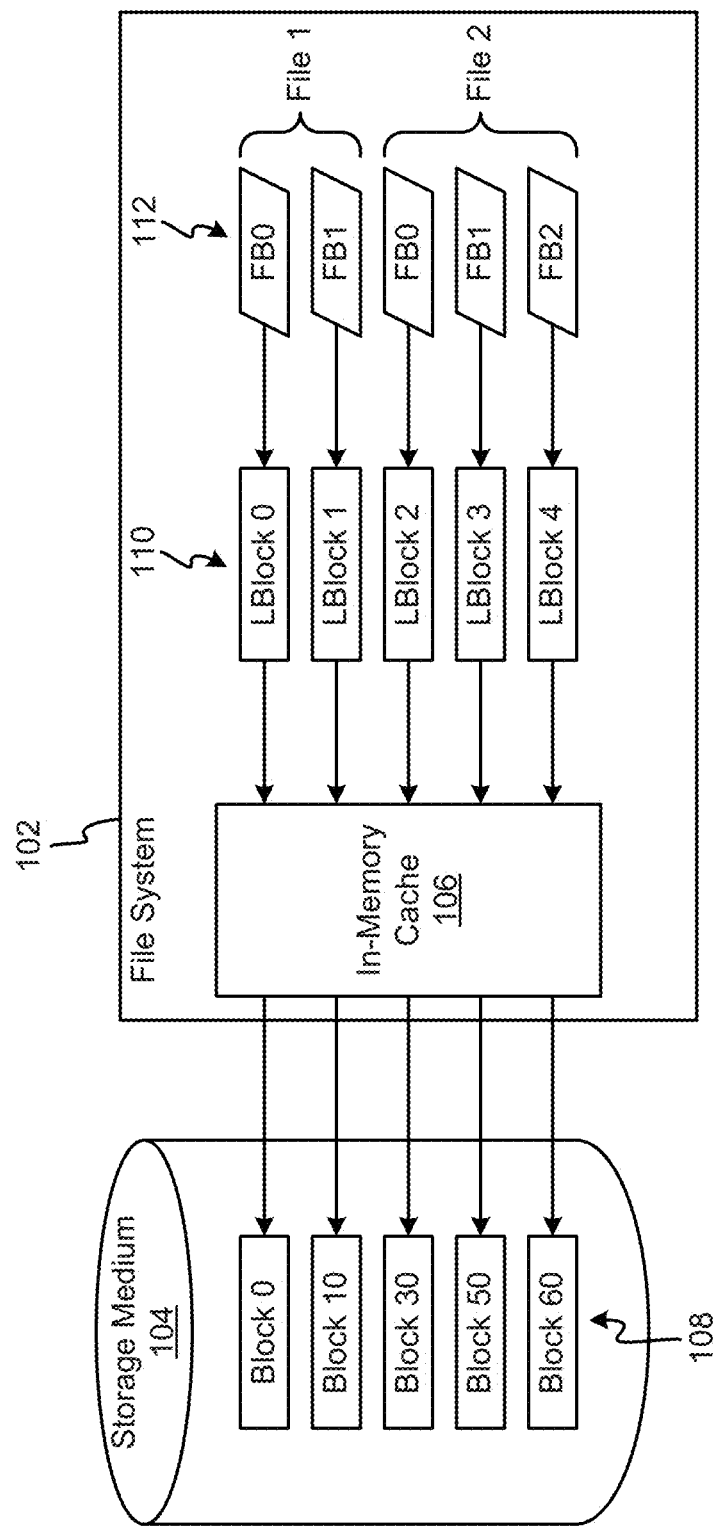
FIG. 1 illustrates mapping of file blocks to blocks on a storage medium using a file system, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for efficient management of higher tiers in a multi-tiered file system, particularly with regard to identifying and managing high access files.

In one general embodiment, a method for managing data includes determining that a cache access count for a given data block is greater than an average cache access count for a plurality of data blocks, receiving a list of active applications accessing the given data block with an anticipated access count for each active application contingent upon the cache access count being greater than the average cache access count, receiving a list of applications that are anticipated to access the given data block within a time window with an anticipated future access count for each anticipated application contingent upon the cache access count being greater than the average cache access count, determining that a block application access weight is greater than a block application access threshold contingent upon the cache access count being greater than the average cache access count, determining that a cache profile weight for the given data block is greater than zero contingent upon the block application access weight being greater than the block application access threshold, and sending the cache profile weight to a file system contingent upon the cache profile weight being greater than zero.

In another general embodiment, a system includes a processor and logic integrated with and/or executable by the processor, the logic being configured to determine a cache profile weight for a given data block upon receiving a request to evict the given data block from cache, and determine a storage tier to store the given data block based on at least one of: an extent cache profile weight of an extent including the given data block, and a heat count for the given data block.

In yet another general embodiment, a computer program product for managing data includes a computer readable storage medium having program code embodied therewith, the program code being readable and/or executable by a processor to cause the processor to determine, by the processor, that a cache access count for a given data block is greater than an average cache access count for a plurality of data blocks, receive, by the processor, a list of active applications accessing the given data block with an anticipated access count for each active application contingent upon the cache access count being greater than the average cache access count, receive, by the processor, a list of applications that are anticipated to access the given data block within a time window with an anticipated future access count for each anticipated application contingent upon the cache access count being greater than the average cache access count, determine, by the processor, that a block application access weight is greater than a block application access threshold contingent upon the cache access count being greater than the average cache access count, determine, by the processor, that a cache profile weight for the given data block is greater than zero contingent upon the block application access weight being greater than the block application access threshold, and send, by the processor, the cache profile weight to a file system contingent upon the cache profile weight being greater than zero.

Figure 2:
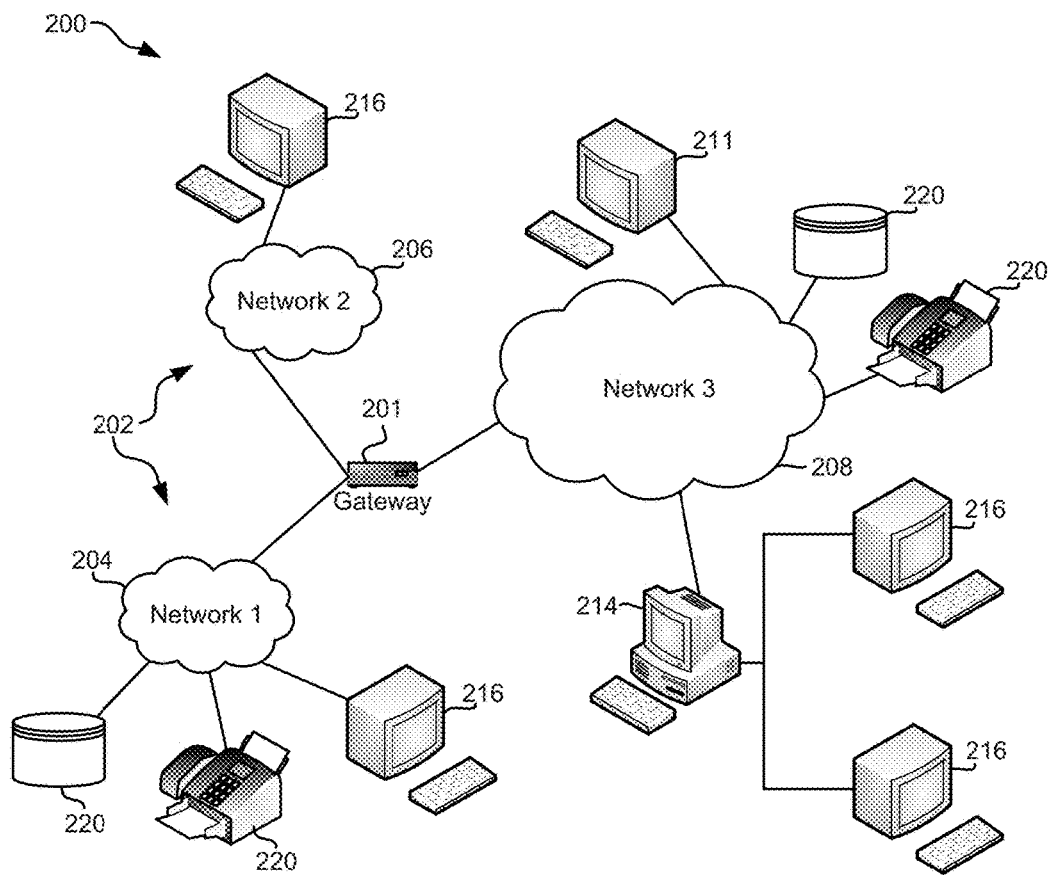
FIG. 2 illustrates a network architecture, in accordance with one embodiment.

FIG. 2 illustrates an architecture 200, in accordance with one embodiment. As shown in FIG. 2, a plurality of remote networks 202 are provided including a first remote network 204 and a second remote network 206. A gateway 201 may be coupled between the remote networks 202 and a proximate network 208. In the context of the present architecture 200, the networks 204, 206 may each take any form including, but not limited to a LAN, a WAN such as the Internet, public switched telephone network (PSTN), internal telephone network, etc.

In use, the gateway 201 serves as an entrance point from the remote networks 202 to the proximate network 208. As such, the gateway 201 may function as a router, which is capable of directing a given packet of data that arrives at the gateway 201, and a switch, which furnishes the actual path in and out of the gateway 201 for a given packet.

Further included is at least one data server 214 coupled to the proximate network 208, and which is accessible from the remote networks 202 via the gateway 201. It should be noted that the data server(s) 214 may include any type of computing device/groupware. Coupled to each data server 214 is a plurality of user devices 216. Such user devices 216 may include a desktop computer, lap-top computer, hand-held computer, printer or any other type of logic. It should be noted that a user device 211 may also be directly coupled to any of the networks, in one embodiment.

A peripheral 220 or series of peripherals 220, e.g., facsimile machines, printers, networked and/or local storage units or systems, etc., may be coupled to one or more of the networks 204, 206, 208. It should be noted that databases and/or additional components may be utilized with, or integrated into, any type of network element coupled to the networks 204, 206, 208. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 204, 206, 208, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 3:
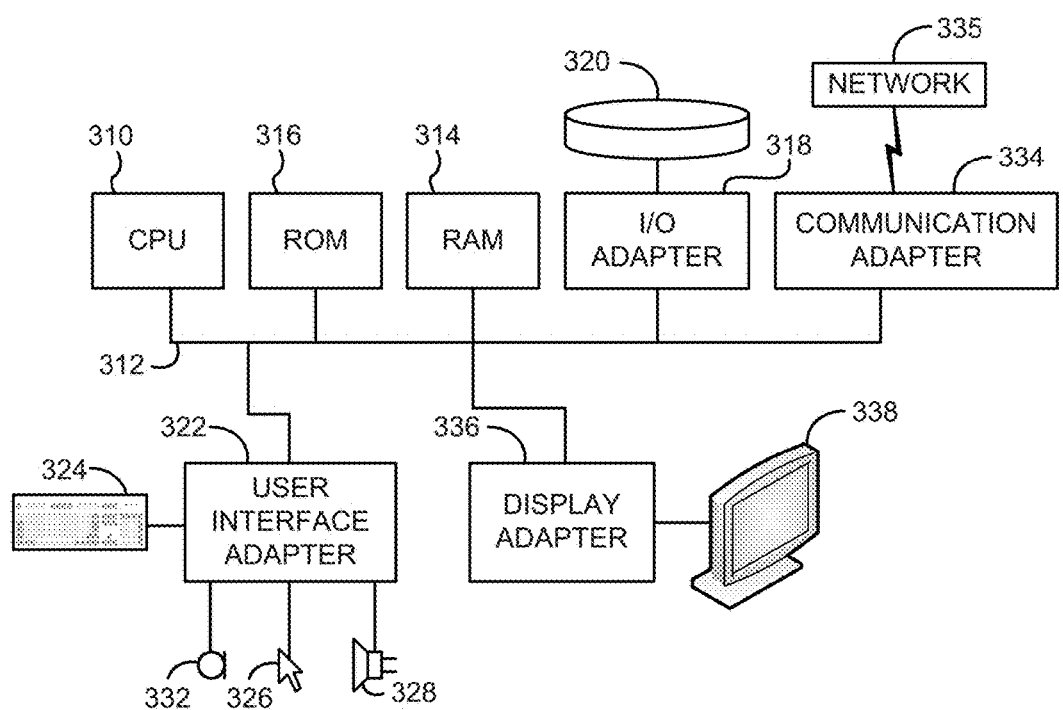
FIG. 3 shows a representative hardware environment that may be associated with the servers and/or clients of FIG. 2, in accordance with one embodiment.

FIG. 3 shows a representative hardware environment associated with a user device 216 and/or server 214 of FIG. 2, in accordance with one embodiment. Such figure illustrates a typical hardware configuration of a workstation having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen and a digital camera (not shown) to the bus 312, communication adapter 334 for connecting the workstation to a communication network 335 (e.g., a data processing network) and a display adapter 336 for connecting the bus 312 to a display device 338.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 4:
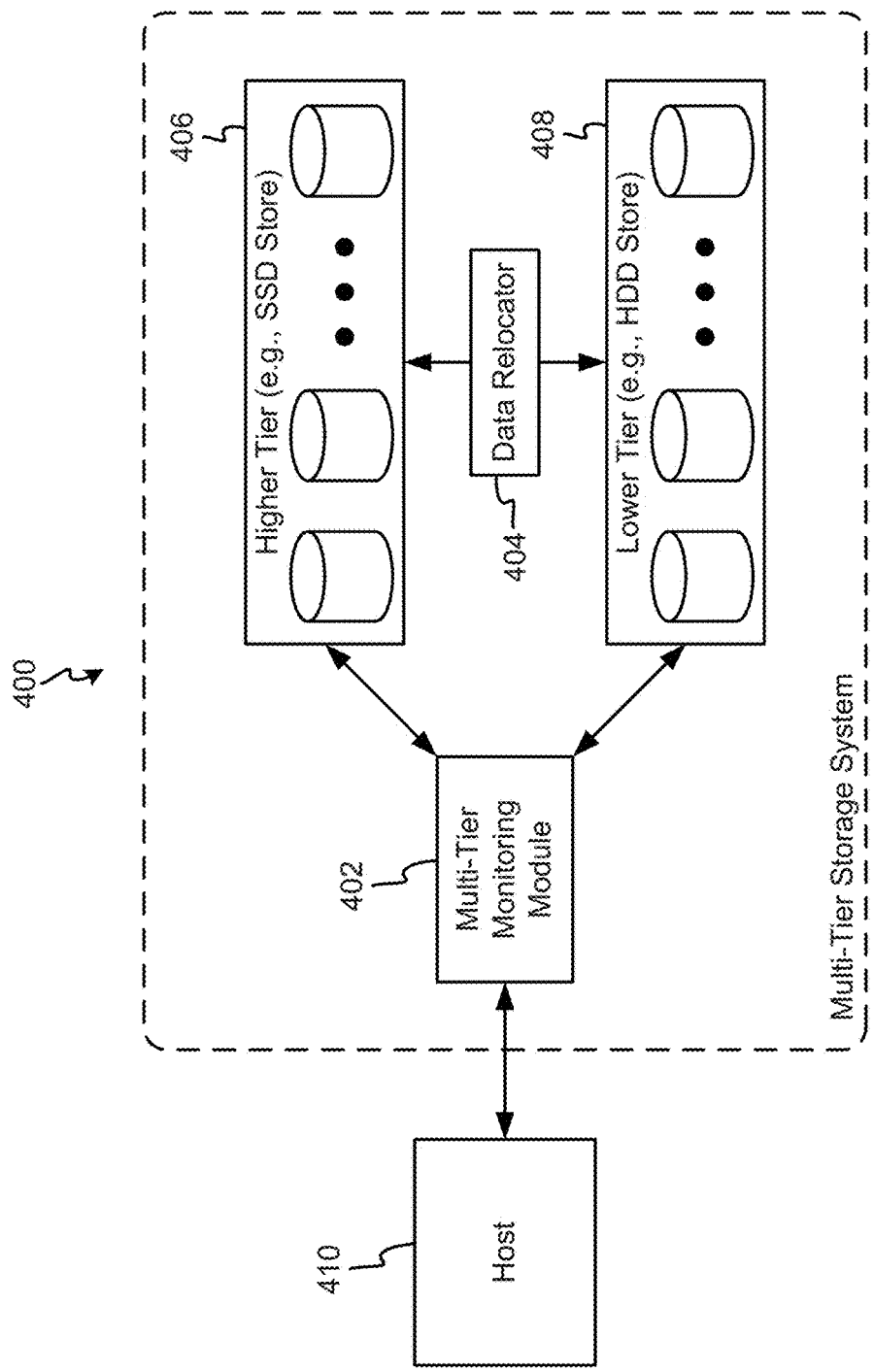
FIG. 4 illustrate a problem with snapshot creation in a file system in one example.

As shown in FIG. 4, a multi-tier monitoring module 402, which is configured to monitor for I/Os performed on storage media (such as hard disk drives (HDDs), optical disk drives, magnetic tape, etc.), may be provided with a multi-tier storage system 400. This multi-tier storage system 400 may be based an IBM Easy-Tier architecture or some other multi-tier system known in the art. The multi-tier monitoring module 402 may receive data and/or instructions and commands from a host 410 connected thereto. Based on data access frequency, the multi-tier monitoring module 402 is configured to identify data that is heavily accessed ("hot"), possibly relying on a number of access counts for the data being above a predetermined threshold.

A data relocator 404 is configured to store this hot data on a higher tier 406, which may have SSDs or some other suitable storage media, for high throughput, low response times, and I/O operations per second (IOPS)-energy-efficient characteristics. As a result, the amount of expensive storage required to meet a given level of performance is minimized compared to other methods of data placement for tiered storage. This hot data may be moved from a lower tier 408, and after the data is no longer considered to be hot, it may be moved back to the lower tier 408, in various approaches.

Figure 5:
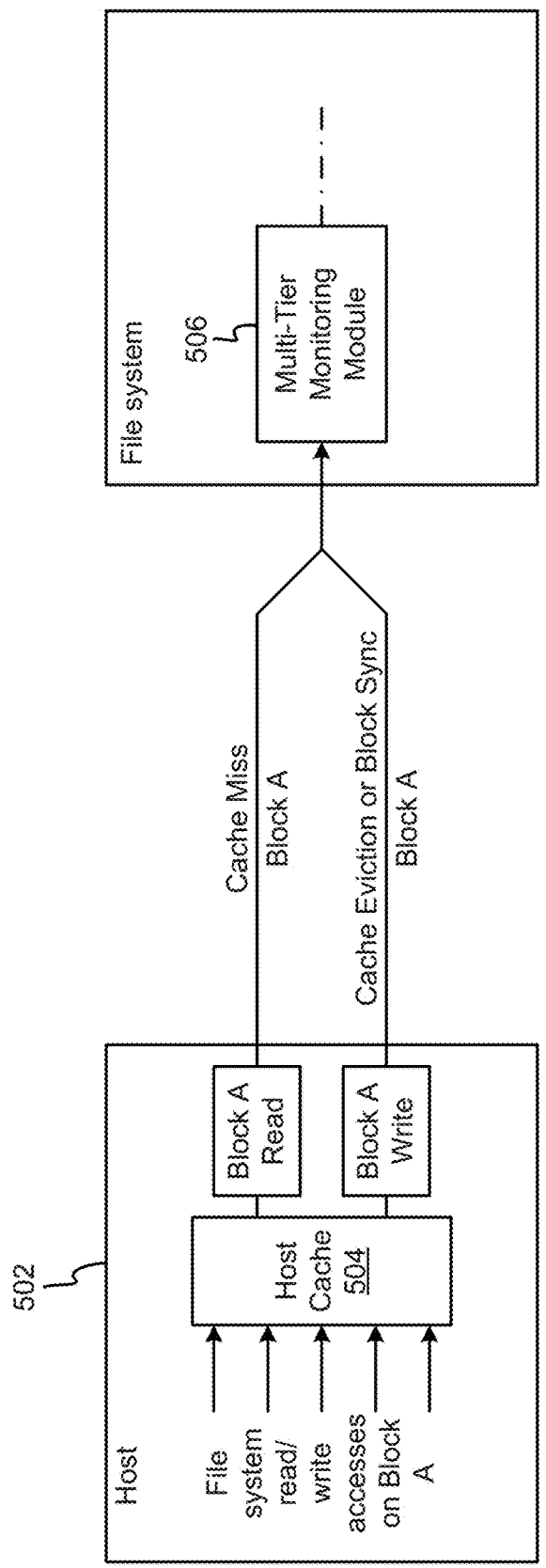
FIG. 5 shows read and write visibility outside of a file system, in one example.

One of the problems with multi-tiered data storage is described with regard to FIG. 5. A situation is shown in FIG. 5 where a host 502 (which may comprise an application), similar to a storage system, may comprise a host cache 504. For a first access of a particular block of data, when the data block is not stored in the host cache 504, a "Cache Miss" is reported which triggers a block read operation to be issued to the storage system via the multi-tier monitoring module 506. After this first block read from the storage system outside of the host 502, subsequent accesses to the same data block are resolved using the host cache 504 until the data block is evicted from the host cache 504.

A block write operation may be triggered when the data block is modified, according to a host cache eviction policy, during block synchronization, and/or in response to or during some other event known in the art. In the case of a block write operation being triggered on the storage system, any data block read/write outside of the host 502 does not actually map directly to the actual application read/write; instead, they are reported as a "Cache Miss" and cache evictions or block syncs.

As shown in FIG. 5, the storage system has performed six accesses on Block A. The first access caused a "Cache Miss" for a Block A read, the next four accesses were performed using the host cache 504. Then, assuming that Block A is modified, based on an eviction policy or block synchronization requirement, Block A is moved from the host cache 504. This is seen as a Block A write to the storage system.

Therefore, for six application accesses of Block A, the multi-tier monitoring module 506 will receive either two accesses (a block read and a block write when Block A has been modified by the application) or one access (for the first block read prior to the block being stored to the host cache 504). Thus, there is mismatch that may affect how high access frequency data is determined.

Figure 6:
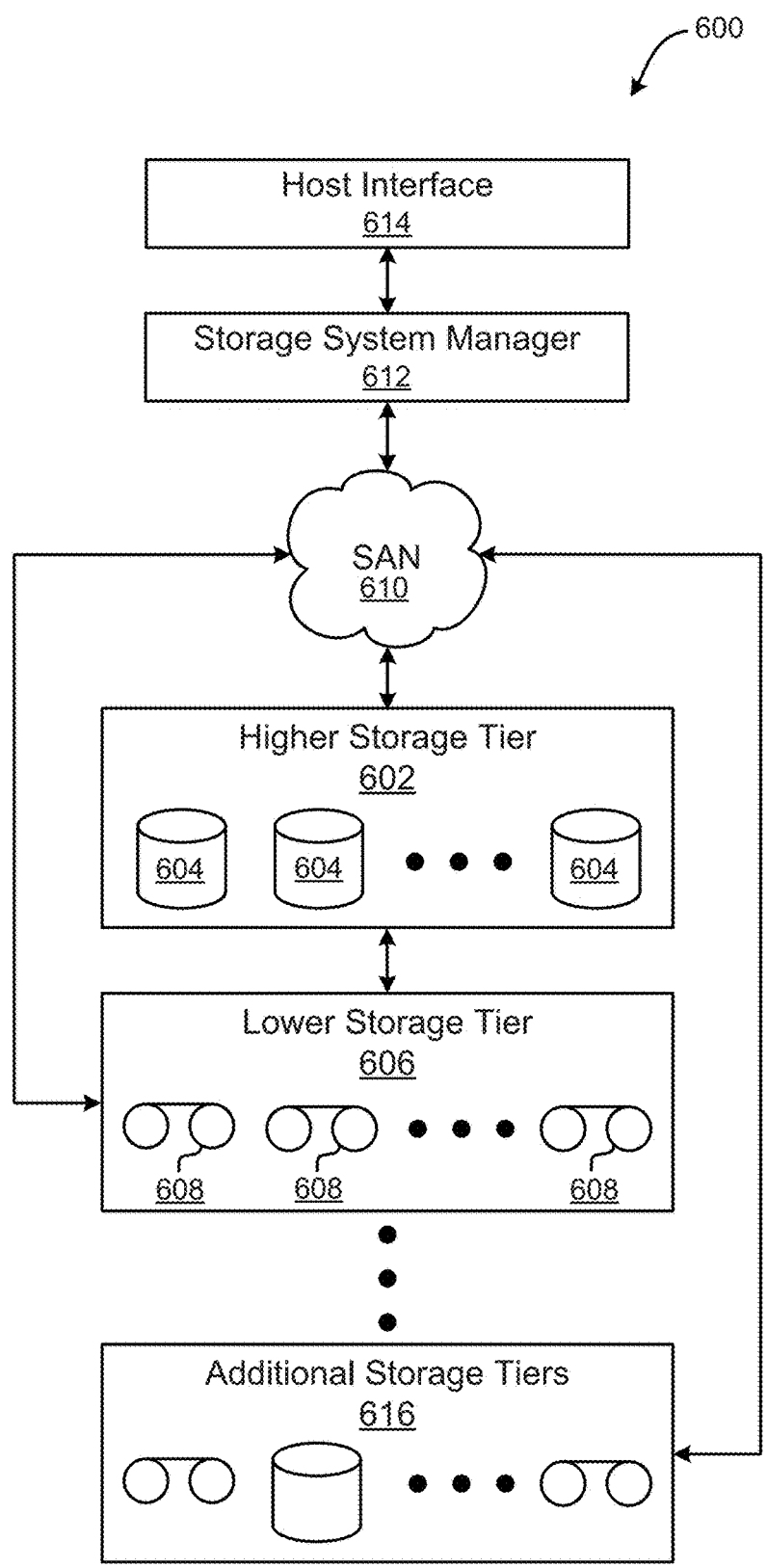
FIG. 6 illustrates a tiered data storage system in accordance with one embodiment.

Now referring to FIG. 6, a storage system 600 is shown according to one embodiment. Note that some of the elements shown in FIG. 6 may be implemented as hardware and/or software, according to various embodiments. The storage system 600 may include a storage system manager 612 for communicating with a plurality of media on a higher storage tier 602 and a lower storage tier 606. The higher storage tier 602 preferably may include one or more random access and/or direct access media 604, such as hard disks in hard disk drives (HDDs), nonvolatile memory (NVM), solid state memory in solid state drives (SSDs), etc., and/or others noted herein. The lower storage tier 606 may preferably include one or more sequential access media 608, such as magnetic tape in tape drives, optical media, etc., and/or others noted herein. Additional storage tiers 616 may include any combination of storage memory media. The storage system manager 612 may communicate with the storage media 604, 608 on the higher and lower storage tiers 602, 606 through a network 610, such as a storage area network (SAN), as shown in FIG. 6. The storage system manager 612 may also communicate with one or more host systems (not shown) through a host interface 614, which may or may not be a part of the storage system manager 612. The storage system manager 612 and/or any other component of the storage system 600 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 600 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 602, may include a majority of SSD storage media for storing data in a higher performing storage environment, and remaining storage tiers, including lower storage tier 606 and additional storage tiers 616 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 602, while data not having one of these attributes may be stored to the additional storage tiers 616, including lower storage tier 606. Of course, one of skill in the art, upon reading the present descriptions, may devise many other combinations of storage media types to implement into different storage schemes, according to the embodiments presented herein.

According to some embodiments, the storage system (such as 600) may include logic adapted to receive a request to open a data set, logic adapted to determine if the requested data set is stored to a lower storage tier 606 of a tiered data storage system 600 in multiple associated portions, logic adapted to move each associated portion of the requested data set to a higher storage tier 602 of the tiered data storage system 600, and logic adapted to assemble the requested data set on the higher storage tier 602 of the tiered data storage system 600 from the associated portions.

Of course, this logic may be implemented as a method on any device and/or system or as a computer program product, according to various embodiments.

Figure 7:
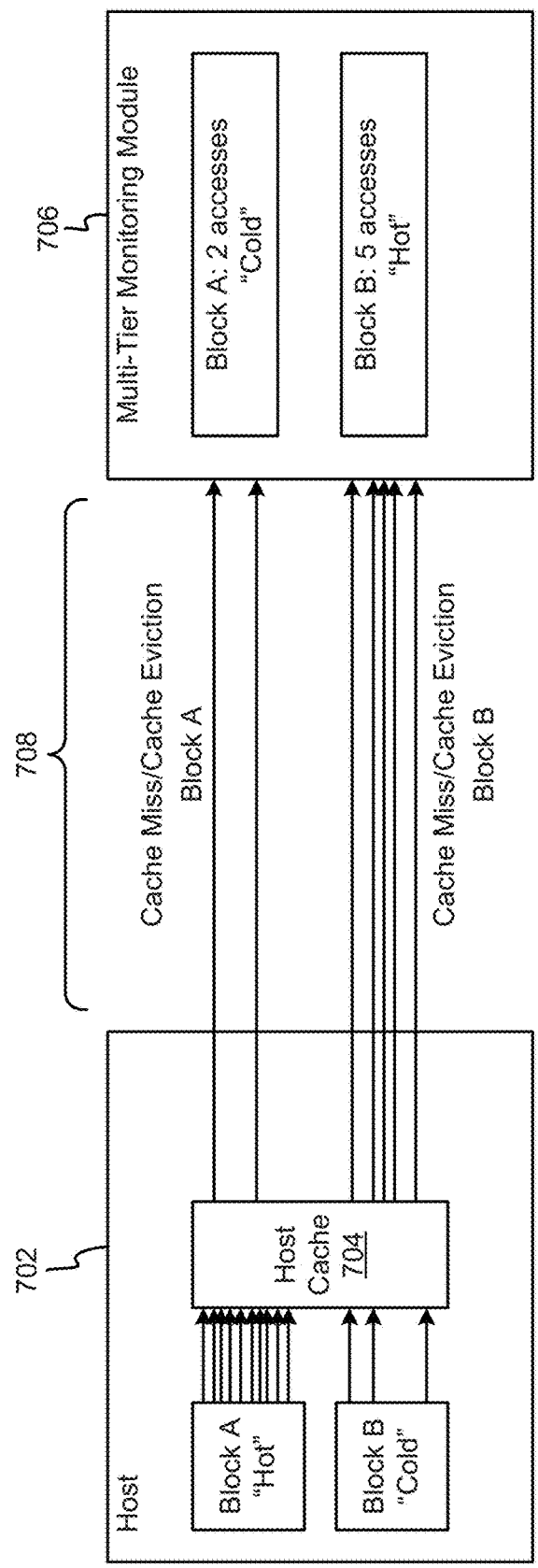
FIG. 7 shows a portion of a file system, according to one embodiment.

Now referring to FIG. 7, one problem with traditional methods of determining the access frequency of data in a file system is shown, according to one example. In order to make the determination that a given data block is "hot," the number of times that the data block is accessed on the I/O line 708 is tracked. However, from a point of view of the multi-tier monitoring module 706, this traffic is due to Cache Misses (Reads) and Cache Evictions (Writes), and not every data block access is visible. Therefore, observed traffic may not be directly mapped to application access count (the number of times that the data block is accessed by the application). This leads to a mismatch between which data blocks the application considers "hot" and which data blocks the multi-tier monitoring module 706 considers "hot," which ultimately impacts multi-tier placement policy and decisions.

It is noted that hot blocks that are stored on the host 702 within the host cache 704 should not also be placed on the higher tier of the data storage system, as this will lead to unnecessary wastage of higher tier space. Instead, it is pointed out that as long as a data block is in host cache 704, there is no need to move it to a higher storage tier. Furthermore, when the data is evicted from the host cache 704, the cache hit profile (which includes the number of accesses while the data block was in the host cache) for that data block should be considered in determining whether the data block is "hot" or "cold" for placement in one of the tiers of the multi-tier storage system. If this cache hit profile is not considered, it results in higher latencies for the "hot" data blocks during access on one of the storage tiers.

As an example, as shown in FIG. 7, Block A is considered "hot" by the application with ten accesses; however, there are only two Cache Miss/Evictions for Block A which are seen by the multi-tier monitoring module 706 since most of the accesses are performed within the host cache 704. Meanwhile, Block B is considered "cold" by the application with only three accesses, but as part of LRU cache policy or some other scheme or policy, Block B was evicted many times which caused more Cache Misses, resulting in five accesses visible to the multi-tier monitoring module 706. Thus, the multi-tier monitoring module 706 might consider Block B as the "hot" block compared to Block A, which may be considered "cold." During placement on a higher storage tier, Block B will be preferred and placed in a higher storage tier when compared to Block A. However, this conclusion is lacking the visibility of how many accesses occurred on the host cache 704, which is referred to as host access count, which leads to a wrong interpretation of application hot data and access latencies when hot application blocks are evicted from the host cache 704.

Thus, application hot Block A, when evicted from the host cache 704, might be placed directly to a lower storage tier. Missing this consideration results in higher latencies for the really hot application blocks during storage tier accesses, e.g., a file system might be syncing a cache copy for this block but the sync operation might take a lot of time as the data block is not on the higher storage tier and accesses will be performed only on the higher storage tier, which means the data block must be promoted prior to access.

In order to provide efficient management of high performance tiers in a multi-tier architecture, data block access count monitoring, referred to as a "heatmap information," may be influenced by introducing information based on a cache access profile for each data block such that during disk I/O operation, when the cache hit count of a given block is significantly more than an average cache hit count, the file system may determine whether this given data block would benefit from high performance accesses for disk I/Os, and assign CacheProfileWeight to the given data block. The multi-tier monitoring module may consider CacheProfileWeight to influence heatmap information maintained for the given data block.

The file system may assign CacheProfileWeight to the given data block based on any of the following conditions: 1) average cache hits per data block at the file system level, 2) state of the application accesses, and 3) purpose of the access request (e.g., disk I/O).

The average cache hits per data block at the file system level may be based on a number of cache hits on this data block compared with an average value for all data blocks.

The state of the application accesses may be based on how many applications are currently accessing the given data block and an access frequency for each application, including a number of applications that have the possibility of accessing the data block in the near future (next 10 minutes, next 5 minutes, next minute, next 30 seconds, next 10 seconds, next 5 seconds, next 1 second, etc., depending on the granularity of information provided on access frequency) and access frequency. The purpose of the access request may be for several different reasons. One reason is for storage medium synchronization, where CacheProfileWeight value will be higher as I/Os are needed to be performed immediately. When the purpose of the access request is cache eviction due to LRU or some other policy, CacheProfileWeight will be less than in the case of disk sync.

At the multi-tier monitoring module, CacheProfileWeight will be considered apart from monitored access counts (in the heatmap) to conclude whether a given block is hot and eligible for placement on a higher performance storage tier, in this embodiment. In implementation, existing file system caches maintain in-memory data structures for each data block that is present in the in-memory cache. It includes fields, such as last access time and access counts, which are used by the cache eviction policy mechanism. This mechanism may be extended to have overall cache hit count and average cache hit count values as well.

During an access request operation (e.g., a disk I/O), when the cache hit count of the given block is significantly more than the average cache hit count for all data blocks, the file system may determine whether this data block would benefit from high performance accesses for accesses based on any of: cache hit counts, live and future applications possibly requesting this block, and respective access frequency and purpose of eviction. The CacheProfileWeight value is determined for the given data block. The CacheProfileWeight value is passed to the multi-tier monitoring module, where the heatmap table stored therein is updated to consider this value. A multi-tier relocation module then considers this CacheProfileWeight value as another criteria apart from observed disk accesses during heatmap calculation of the given data block and placement on higher performance storage tiers.

When a non-dirty block is evicted, there is no access request (e.g., disk I/O) involved, but if that data block has high CacheProfileWeight and the application(s) might use it in the near future, a special cache profile command (e.g., CACHE_PROFILE_CMD) may be used to communicate the CacheProfileWeight value to the host (appliance).

For communication between the file system and the multi-tier appliance, a separate out-of-band protocol may be used, or reserved fields in the I/O command descriptor block (CDB) (e.g., SCSI CDB) may be used. This is to ensure that in remote copy scenarios, when a fail over occurs, the right data is desired to be in the higher performance storage tier. This mechanism may be used for communication of percentage heat transfer value from the host (application) to the multi-tier monitoring module in the multi-tier file system.

Figure 8:
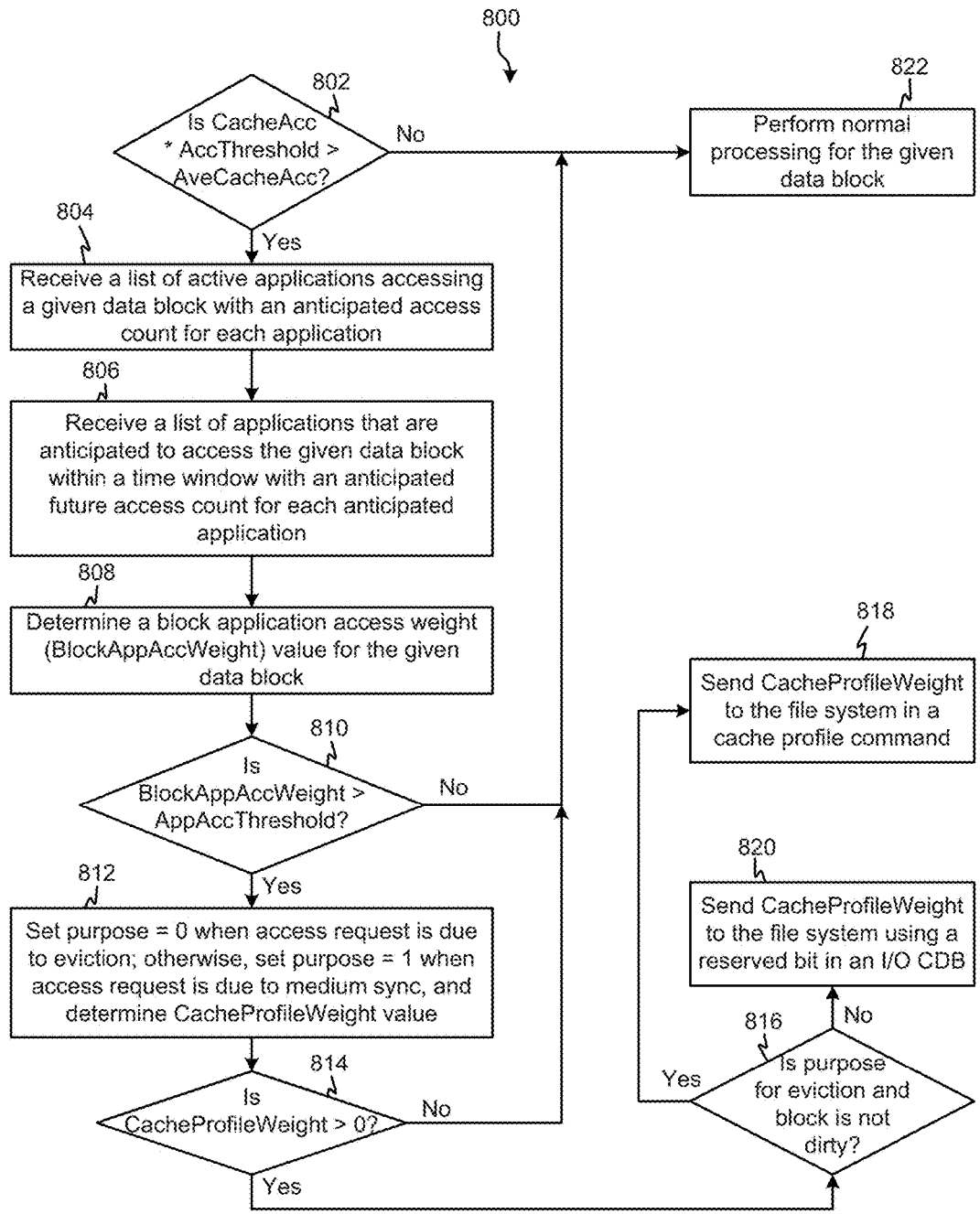
FIG. 8 is a flowchart of a method for managing data according to one embodiment.

Now referring to FIG. 8, a flowchart of a method 800 for managing data is shown according to one embodiment. Method 800 may be executed in any desired environment, including those shown in FIGS. 1-7, among others. Furthermore, more or less operations than those specifically described in FIG. 8 may be included in method 800.

In operation 802, it is determined whether a cache access count (CacheAcc), or cache hit count, for a given data block is greater than an average cache access count (AveCacheAcc). This determination may be made during, directly after, immediately following, close in proximity to, and/or triggered by a request for or actual cache block eviction and/or a request for and/or an actual medium synchronization (e.g., disk sync, etc.) for the given data block.

In one embodiment, the AveCacheAcc may be multiplied by an access count threshold (AccThreshold) which may be adjusted to account for conditions of the system, as would be understood by one of skill in the art. By default, the AccThreshold may be set to 1, but any positive value may be used to tweak the desired behavior of the system, such as 1.25, 1.5, 2.0, 0.8, 0.75, 0.6, 0.5, etc., or more or less.

When the CacheAcc is not greater than the AveCacheAcc (with and without the AccThreshold used in the calculation according to alternate embodiments), method 800 continues to operation 822 where the given data block is processed normally (e.g., without using a calculated CacheProfileWeight in the placement decision).

In operation 804, a list of active applications that are currently accessing the given data block is received. This list may also include an anticipated access count for each application for the given data block. This anticipated access count may be based on any desired factor, and may rely on historical and/or learned information about the applications, the given data block, etc.

In operation 806, a list of applications that are anticipated to access the given data block within a time window is received. This time window may include the near future, a predetermined amount of time in which the anticipated given data block accesses would be affected by the placement of the given data block on lower or higher storage tiers within the file system, as would be understood by one of skill in the art.

This list may also include an anticipated future access count for each anticipated application for the given data block. This anticipated future access count may be based on any desired factor, and may rely on historical and/or learned information about the applications, the given data block, etc.

In operation 808, a block application access weight (BlockAppAccWeight) is determined for the given data block. Any desired formula may be used to calculate the BlockAppAccWeight known in the art. The BlockAppAccWeight may be calculated using Formula 1, according to one embodiment.

Changes, manipulations, and substitutions may be made to this formula, as would be understood by one of skill in the art, without violating the inherent purpose of the calculation. When SCA (sum of current accesses) is the sum of the anticipated access counts for current active application(s) in the near future for the given block, SFA (sum of future accesses) is the sum of anticipated access count(s) for the applications that might start in the near future for the given block, then Formula 1 may be as shown below.

$$BlockAppAccWeight = A*SCA + B*SFA \quad \text{Formula 1}$$

In Formula 1, A and B are system defined parameters, which may range in value from 0.1 to 10, or more or less, depending on a desired effect on the system's performance. Either or both of A and B may be defaulted to 1, in one approach.

In operation 810, it is determined whether the BlockAppAccWeight is greater than an application access threshold (AppAccThreshold). The AppAccThreshold may be a system variable which may be set to cause certain system performance, and may be set to any positive value, such as 1, 10, 100, 200, 500, 1000, 10,000, 50,000, 100,000, etc.

When BlockAppAccWeight is greater than AppAccThreshold, method 800 continues to operation 812; otherwise, method 800 returns to operation 822 to perform normal processing of the given data block.

In operation 812, a variable referred to as "Purpose" is initialized and set to zero when the access and/or access request for the given data block is performed for a cache eviction; otherwise, Purpose is set to 1 when the access and/or access request for the given data block is performed for medium synchronization (e.g., disk sync, etc.). Furthermore, in operation 812, the CacheProfileWeight value for the given data block is calculated.

Any suitable formula may be used to calculate the CacheProfileWeight value, and in one embodiment, Formula 2, described later, may be used to calculate the CacheProfileWeight value.

In order to calculate the CacheProfileWeight value, Formula 2 shown below may be used, in one approach. Changes, manipulations, and substitutions may be made to this formula, as would be understood by one of skill in the art, without violating the inherent purpose of the calculation. When AveCacheAcc is the average cache access count at the file system in-memory cache before the given data block is evicted, CacheAcc is the cache access count for the given data block, BlockAppAccWeight is the application block weight value determined from the previous formula, purpose is 0 for eviction and 1 for file sync, LastAccDur is a difference between a last access time when the given data block is accessed and a current time, which is set when the purpose is eviction (i.e., purpose=0), and DataSyncFreq is a frequency of storage medium data synchronization for the given data block, which is set when the purpose is medium synchronization (i.e., purpose=1).

There are two conditions that, in one embodiment, would cause the CacheProfileWeight value to be reported as 0. These two conditions are when AveCacheAcc*AccThreshold>CacheAcc, and when AppAccWeight>AppAccThreshold. Otherwise, the CacheProfileWeight may be calculated as:

$$CacheProfileWeight = X*CacheAcc/AveCacheAcc + Y*AppAccWeight - (Z*(1-Purpose)*LastAccDur) + (W*Purpose*DataSyncFreq) \quad \text{Formula 2}$$

In Formula 2, X, Y, Z and W are system defined parameters, which may range in value from 0.1 to 10, or more or less, depending on a desired effect on the system's performance. Any of X, Y, Z, and/or W may be defaulted to 1, in one approach.

Then, in operation 814, it is determined whether CacheProfileWeight is greater than zero. When CacheProfileWeight >0, method 800 continues to operation 816; otherwise, method 800 returns to operation 822 to perform normal processing of the given data block.

In operation 816, it is determined whether the Purpose is for cache eviction (e.g., equal to 0) or for medium synchronization (e.g., equal to 1). When the Purpose is for cache eviction and the data block is not dirty (e.g., is in an invalid, valid, or reserved state, but is not the only copy of the data in an incoherent state which needs to be updated), method 800 continues to operation 818; otherwise, method 800 continues to operation 820.

In operation 818, the CacheProfileWeight is sent to the file system (e.g., via the data relocator module, the multi-tier monitoring module, etc.) in a cache profile command (e.g., a CACHE_PROFILE_CMD that includes the CacheProfileWeight).

In operation 820, the CacheProfileWeight is sent to the file system (e.g., via the data relocator module, the multi-tier monitoring module, etc.) using one or more reserved bits in an I/O CDB, such as a SCSI CDB, which is explained in more detail herein.

In this embodiment, the file system CacheProfileWeight calculation may be performed during cache eviction or medium synchronization and reported using the following exemplary SCSI Read/Write CDB, as would be understood by one of skill in the art. In this SCSI CDB, the top row indicates the bit position, while the first column indicates the byte location.

|  | 7 | 6 | 5 | 4 | 3 | 2 | 1 | 0 |
|---|---|---|---|---|---|---|---|---|
| 0 | | | | Operation code = 88 | | | | |
| 1 | WRPROTECT | | | DPO | FUA | Res. | FUA_NV | Res. |
| 2-9 | | | | LBA | | | | |
| 10-13 | | | | Transfer Length | | | | |
| 14 | Restricted for MMC-4 | | Res. | | | Group Number | | |
| 15 | | | | Control | | | | |

Bit 2 from Byte 1 and Bits 5 and 6 from Byte 14 are reserved (Res.). These three bits may be used to transfer the CacheProfileWeight value in this I/O (e.g., SCSI) CDB, according to one embodiment. Because three bits are available, this provides for 8 values in a range from 0-7 for the CacheProfileWeight value. In one embodiment, 0 indicates a small weight value, while 7 indicates a maximum weight value, with the range of numbers therebetween indicating varying other degrees of weight to be assigned to the data block in consideration for storage location and access frequency.

In an alternate embodiment, 7 is small while 0 is large. For less granularity, only two of the reserved bits may be used, resulting in four possible values, 0-3, which may distributed and used in the same fashion.

After both of operations 818 and 820, the given data block is processed using the CacheProfileWeight to determine storage tier placement, when appropriate, such as by using the data relocator module and/or the multi-tier monitoring module, in various approaches.

In one embodiment, a heatmap monitoring table may be maintained on the multi-tier monitoring module. One exemplary heatmap monitoring table is shown in Table 1, below. The multi-tier monitoring module increments the access count values when any access to blocks in the given range is accessed and/or request to one of these blocks is received. In a further embodiment, entries in this heatmap monitoring table may include a column that stores ExtentCacheProfileWeight values. The ExtentCacheProfileWeight value is a sum of the CacheProfileWeight for all blocks in the given extent, as per the inputs provided by the file system. The data relocator module may refer to these entries in the heatmap monitoring when deciding whether a given block and/or a given extent is hot and should be placed on the higher storage tier in various embodiments.

TABLE 1

| Extent # | Starting Block # | Ending Block # | Access Count | Extent Cache Profile Weight |
|---|---|---|---|---|
| 1 | 0 | 9 | 100 | 10 |
| 2 | 10 | 19 | 120 | 20 |
| 3 | 20 | 29 | 50 | 35 |
| 4 | 30 | 39 | 110 | 20 |

TABLE 1-continued

| Extent # | Starting Block # | Ending Block # | Access Count | Extent Cache Profile Weight |
|---|---|---|---|---|
| 5 | 40 | 49 | 25 | 250 |
| 6 | 50 | 59 | 30 | 100 |

To handle the CacheProfileWeight value at the data relocator module, the following steps may be taken. For any medium I/O command on the given data block, the data relocator module may determine whether an associated SCSI CDB has a CacheProfileWeight therein, possibly stored to reserved fields thereof, in one embodiment. When the CDB has a CacheProfileWeight, the data relocator module may refer to the heatmap monitoring table in order to determine an extent number for the given data block (the extent which contains the given data block). Next, the ExtentCacheProfileWeight reported in the column associated with the given data block's extent is added to the CacheProfileWeight value included in the CDB.

In another embodiment, when a CACHE_PROFILE_CMD is received, the data relocator may also utilize the heatmap monitoring table in order to determine the extent number for the given data block (the extent which contains the given data block). Next, the ExtentCacheProfileWeight reported in the column associated with the given data block's extent is added to the CacheProfileWeight value included in the CACHE_PROFILE_CMD.

Figure 9:
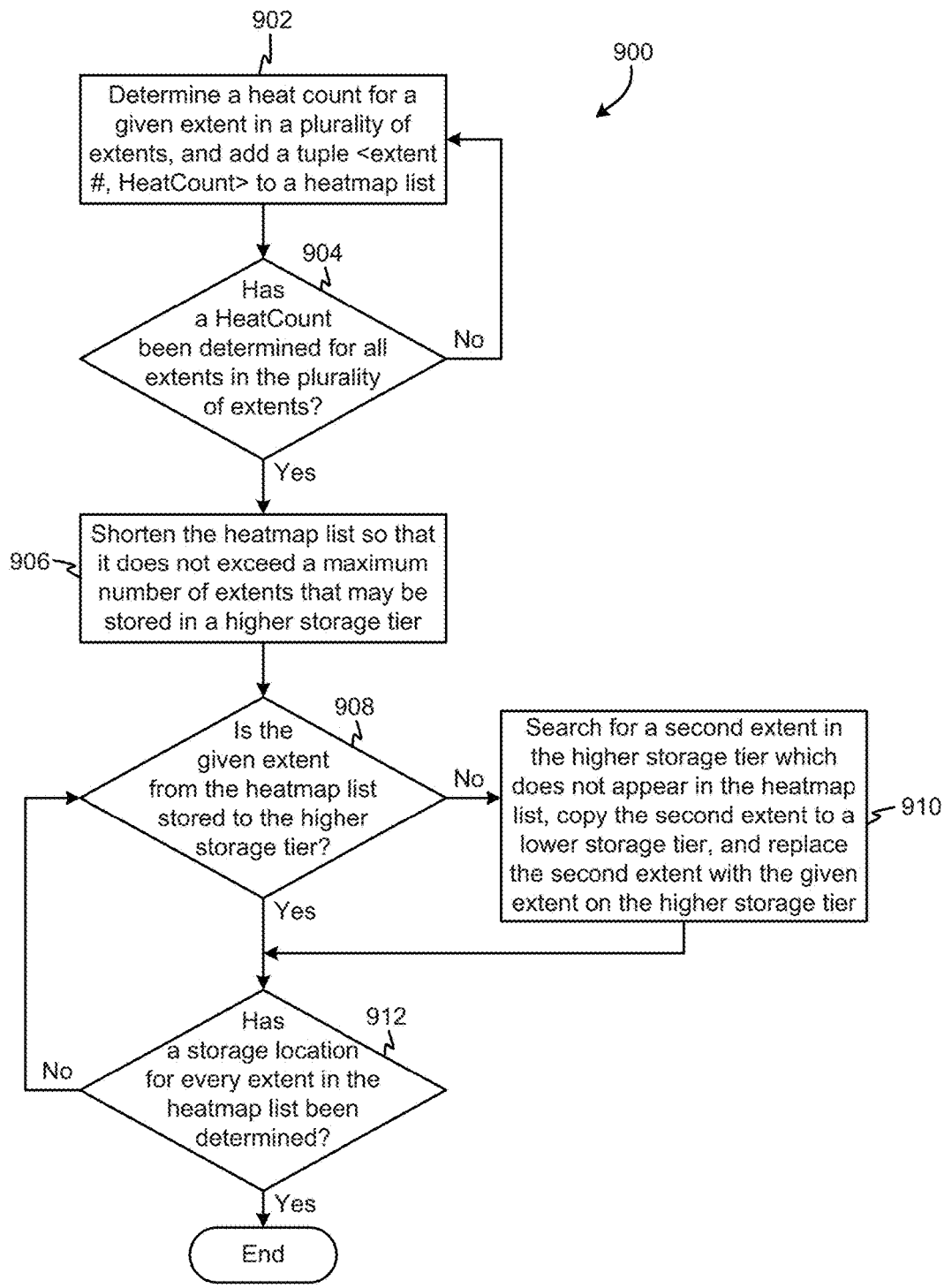
FIG. 9 is a flowchart of a method for managing data according to one embodiment.

Referring now to FIG. 9, a method 900 for determining a location for one or more extents is shown according to another embodiment. Method 900 may be executed in any desired environment, including those shown in FIGS. 1-7, among others. Furthermore, more or less operations than those specifically described in FIG. 9 may be included in method 900.

In operation 902, a heat count (HeatCount) for a given extent in a plurality of extents is determined. Once the HeatCount is determined, it is added to a heatmap list. In one embodiment, it may be included in the form of a tuple <extent #, HeatCount>. Of course, any format for reporting the extent and HeatCount may be used, as would be known to one of skill in the art.

In one embodiment, in order to determine the HeatCount for an extent, Formula 3 may be used. Of course, any desired formula may be used, as would be understood by one of skill in the art, in various other approaches. In Formula 3, AccessCount is a value from the heatmap monitoring table which reflects a number of data block accesses for a given extent, CacheProfileWeight is a value from the heatmap monitoring table which reflects the CacheProfileWeight for a given extent, which may be calculated according to Formula 2, above.

$$HeatCount = P*AccessCount + Q*CacheProfileWeight \quad \text{Formula 3}$$

In Formula 3, P and Q are system defined parameters, which may range in value from 0.1 to 10, or more or less, depending on a desired effect on the system's performance. Any of P and/or Q may be defaulted to 1, in one approach.

In operation 904, it is determined whether a HeatCount has been determined for all extents in the plurality of extents. When all HeatCounts have been determined and stored to the heatmap list, method 900 continues to operation 906; otherwise, method 900 returns to operation 902 to determine a next extent's HeatCount. This is repeated until HeatCounts have been determined for all extents in the plurality of extents.

In operation 906, the heatmap list is shortened (if necessary) to only include a number of extents which is less than a maximum number of extents that may be stored in a higher storage tier. The higher storage tier may have limited space, and therefore only a predetermined number of extents may be stored to the higher storage tier. Of course, this maximum is dictated by the actual storage capacity of the higher storage tier.

In one embodiment, the heatmap list may be sorted in either increasing order by HeatCount or decreasing order by HeatCount, and then all extents which have the lowest HeatCount values are removed from the heatmap list in order to shorten the heatmap list to the maximum number of extents that may be stored in the higher storage tier.

In operation 908, it is determined whether the given extent from the heatmap list is stored to the higher storage tier already. When the given extent from the heatmap list is stored to the higher storage tier, method 900 continues to operation 912; otherwise, method 900 continues to operation 910.

In operation 910, a second extent in the higher storage tier is searched for and/or located which does not appear in the heatmap list. Once such a second extent is determined, the second extent is copied (or moved) to a lower storage tier, and the second extent is replaced with the given extent on the higher storage tier.

In operation 912, it is determined whether a storage location has been determined for every extent in the heatmap list (and each extent in the heatmap list has been stored to the higher storage tier). When the storage location has been determined for every extent in the heatmap list, method 900 ends; otherwise, method 900 returns to operation 908 to determine a storage location for a next given extent. This is repeated until the storage location has been determined for every extent in the heatmap list.

In one embodiment, in order to determine the HeatCount for an extent, Formula 3 may be used. Of course, any desired formula may be used, as would be understood by one of skill in the art, in various other approaches. In Formula 3, AccessCount is a value from the heatmap monitoring table which reflects a number of data block accesses for a given extent, CacheProfileWeight is a value from the heatmap monitoring table which reflects the CacheProfileWeight for a given extent, which may be calculated according to Formula 2, above. Furthermore, P and Q are system defined parameters, which may range in value from 0.1 to 10, or more or less, depending on a desired effect on the system's performance. Any of P and/or Q may be defaulted to 1, in one approach.

$$HeatCount = P*AccessCount + Q*CacheProfileWeight \quad \text{Formula 3}$$

According to one embodiment, the data relocator module and/or the multi-tier monitoring module may perform method 900 periodically to perform relocation of blocks across storage tiers based on heatmap information.

The methods described above may be executed individually or in combination in a system, device, apparatus, and/or computer program product utilizing a computer readable storage medium.

The system may include logic (hard and/or soft) that is implemented in a processor, of any type known in the art. The logic may be encompassed by the processor, accessible to the processor, and/or stored to memory that the processor accesses to perform the functionality dictated by the logic, according to various embodiments.

The file system solutions presented herein in various embodiments are applicable to storage systems, hybrid storage systems, and storage clouds, among other systems.

To more fully describe the methods presented herein according to various embodiments, consider the following example. Assume that an application is accessing blocks in a sequence of fourteen steps as shown in FIG. 10. This sequence represents an iteration, which may be repeated as many times as necessary to accomplish the desired result. An Application is going to perform multiple iterations of the same steps using different data. Also, assume for this example that the cache is capable of storing only two data blocks, and a LRU policy is implemented on the cache. FIG. 10 shows observations and actions at the cache and multi-tier monitoring module.

At the start and at the end of the fourteen exemplary steps of the iteration, Block A, Block B, and Block C are not present in the cache. When AccThreshold is 30, Block B and Block C will be located on a higher storage tier, such as a SSD tier, a Flash memory Tier, etc., while Block A will be located on a lower storage tier, such as a HDD tier, optical drive tier, magnetic tape tier, etc. Thus, even when Block A is "hot" in regard to the particular application, the multi-tier monitoring module will determine Block A to be "cold." It will place it on the lower storage tier rather than the higher storage tier which will cause access latency at Step 1 when it is accessed from the storage medium.

Currently, multi-tier monitoring modules try to monitor I/Os performed by observing I/O traffic between host and storage devices. The conclusion whether a given block is hot is determined based on how many times block data is accessed across the I/O line. However, in general from an application point of view, this traffic is due to cache misses (reads) and cache evictions (writes).

Table 2 shows an application access sequence for three data blocks, Block A, Block B, and Block C, with application access counts (requests) and medium accesses observed at the multi-tier monitoring module for each data block. The step at which each medium access is observed is indicated in the parenthesis after the number of observed accesses.

TABLE 2

| Block | Application Accesses | Medium Accesses Observed at the Multi-Tier Monitoring Module |
|---|---|---|
| A | 8 | 2 (S1, S13) |
| B | 2 | 4 (S3, S6, S9, S12) |
| C | 2 | 4 (S6, S9, S12, S14) |

Table 3 shows the application access sequence for Block A, Block B, and Block C after 10 iterations, with application access counts (requests) and medium accesses observed at the multi-tier monitoring module for each data block.

TABLE 3

| Block | Application Accesses | Medium Accesses Observed at the Multi-Tier Monitoring Module |
|---|---|---|
| A | 80 | 20 |
| B | 20 | 40 |
| C | 20 | 40 |

This observed traffic might not be directly mapped to application access count. As shown in Tables 2 and 3, application access counts (requests) on Block A are actually 80 after 10 iterations, but the multi-tier monitoring module may observe access counts as only 20. Meanwhile, for Block B and Block C, application accesses are actually 20 but the multi-tier monitoring monitor may observe access counts as 40. Thus, Block A may not be considered as hot compared to Block B and Block C from the multi-tier monitoring module point of view. But from the application view, Block A is really hotter than Block B and Block C, and thus this block, when evicted, may be considered hotter and preferred to be placed on the higher storage tier over Block B and Block C when the application point of view is used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing data, the method comprising:
   determining that a cache access count for a given data block is greater than an average cache access count for a plurality of data blocks;
   receiving a list of active applications accessing the given data block with an anticipated access count for each active application contingent upon the cache access count being greater than the average cache access count;
   receiving a list of applications that are anticipated to access the given data block within a time window with an anticipated future access count for each anticipated application contingent upon the cache access count being greater than the average cache access count;
   determining that a block application access weight is greater than a block application access threshold contingent upon the cache access count being greater than the average cache access count;
   determining that a cache profile weight for the given data block is greater than zero contingent upon the block application access weight being greater than the block application access threshold; and
   sending the cache profile weight to a file system contingent upon the cache profile weight being greater than zero.

2. The method as recited in claim 1, wherein the cache profile weight is sent to a multi-tier monitoring module of the file system by storing bits that represent a value of the cache profile weight in one or more reserved bits of an I/O Command Descriptor Block (CDB) when an access request for the given data block is for medium synchronization purposes.

3. The method as recited in claim 1, wherein the cache profile weight is sent to a multi-tier monitoring module of the file system via a cache profile command when an access request for the given data block is for cache eviction purposes and the given data block is not dirty.

4. The method as recited in claim 1, further comprising calculating the block application access weight contingent upon the cache access count being greater than the average cache access count, wherein the block application access weight is based on the anticipated access counts for all of the active applications and the anticipated future access counts for all of the anticipated applications.

5. The method as recited in claim 1, further comprising calculating the cache profile weight contingent upon the block application access weight being greater than the block application access threshold, wherein the cache profile weight is based on a cache access count for the given data block, an average cache access count for the plurality of data blocks, the block application access weight, a difference between a last access time when the given data block is accessed and a current time when an access request for the given data block is for cache eviction, and a frequency of storage medium data synchronization for the given data block.

6. The method as recited in claim 1, wherein the determining that the cache access count for the given data block is greater than the average cache access count for the plurality of data blocks is performed in response to a cache block eviction request and/or a medium synchronization request for the given data block.

7. The method as recited in claim 1, further comprising determining a storage tier in the file system to store the given data block based at least in part on the cache profile weight.

8. The method as recited in claim 1, wherein data blocks having a higher extent cache profile weight are preferentially stored to a higher storage tier as compared to data blocks having a lower extent cache profile weight, wherein the higher storage tier comprises faster access memory in comparison with a lower storage tier.

9. A system, comprising a processor and logic integrated with and/or executable by the processor, the logic being configured to:
    determine a cache profile weight for a given data block upon receiving a request to evict the given data block from cache, wherein the cache profile weight for the given data block is based on a cache access count for the given data block, an average cache access count for all data blocks in an extent comprising the given data block, a block application access weight, and a difference between a last access time when the given data block was accessed and a current time; and
    determine a storage tier to store the given data block based on at least one of: an extent cache profile weight of the extent comprising the given data block, and a heat count for the given data block.

10. The system as recited in claim 9, wherein the logic is further configured to maintain a heatmap monitoring table, the heatmap monitoring table comprising a plurality of entries storing an extent number for each extent, a starting block number for each extent, an ending block number for each extent, an access count for each extent, and an extent cache profile weight for each extent.

11. The system as recited in claim 10, wherein the logic is further configured to calculate the extent cache profile weight for each extent, wherein the extent cache profile weight for a given extent equals a sum of cache profile weights for all data blocks in the given extent.

12. The system as recited in claim 11, wherein the logic is further configured to calculate the cache profile weight for all data blocks in the given extent, wherein the cache profile weight for a given data block in the given extent is based on a cache access count for the given data block, an average cache access count for all data blocks in the given extent, a block application access weight, and a difference between a last access time when the given data block is accessed and a current time.

13. The system as recited in claim 9, wherein the logic is further configured to preferentially store data blocks having a higher extent cache profile weight to a higher storage tier as compared to data blocks having a lower extent cache profile weight, wherein the higher storage tier comprises faster access memory in comparison with a lower storage tier.

14. A computer program product for managing data, the computer program product comprising a computer readable storage medium having program code embodied therewith, the program code being readable and/or executable by a processor to cause the processor to:
    determine, by the processor, that a cache access count for a given data block is greater than an average cache access count for a plurality of data blocks;
    receive, by the processor, a list of active applications accessing the given data block with an anticipated access count for each active application contingent upon the cache access count being greater than the average cache access count;
    receive, by the processor, a list of applications that are anticipated to access the given data block within a time window with an anticipated future access count for each anticipated application contingent upon the cache access count being greater than the average cache access count;
    determine, by the processor, that a block application access weight is greater than a block application access threshold contingent upon the cache access count being greater than the average cache access count;
    determine, by the processor, that a cache profile weight for the given data block is greater than zero contingent upon the block application access weight being greater than the block application access threshold; and
    send, by the processor, the cache profile weight to a file system contingent upon the cache profile weight being greater than zero.

15. The computer program product as recited in claim 14, wherein the cache profile weight is sent to a multi-tier monitoring module of the file system by storing bits that represent a value of the cache profile weight in one or more reserved bits of an I/O Command Descriptor Block (CDB) when an access request for the given data block is for medium synchronization purposes.

16. The computer program product as recited in claim 14, wherein the cache profile weight is sent to a multi-tier monitoring module of the file system via a cache profile command when an access request for the given data block is for cache eviction purposes and the given data block is not dirty.

17. The computer program product as recited in claim 14, wherein the program code is further readable and/or executable by the processor to calculate, by the processor, the block application access weight contingent upon the cache access count being greater than the average cache access count, wherein the block application access weight is based on a sum of the anticipated access counts for all of the active applications and a sum of the anticipated future access counts for all of the anticipated applications.

18. The computer program product as recited in claim 14, wherein the program code is further readable and/or executable by the processor to calculate, by the processor, the cache profile weight contingent upon the block application access weight being greater than the block application access threshold, wherein the cache profile weight is based on a cache access count for the given data block, an average cache access count for the plurality of data blocks, the block application access weight, a difference between a last access time when the given data block is accessed and a current time when an access request for the given data block is for cache eviction, and a frequency of storage medium data synchronization for the given data block.

19. The computer program product as recited in claim 14, wherein the program code configured to determine that the cache access count for the given data block is greater than the average cache access count for the plurality of data blocks is performed in response to a cache block eviction request and/or a medium synchronization request for the given data block.

20. The computer program product as recited in claim 14, wherein the program code is further readable and/or executable by the processor to determine, by the processor, a storage tier in the file system to store the given data block based at least in part on the cache profile weight, wherein data blocks having a higher cache profile weight are preferred to be stored on higher storage tiers as compared to data blocks having a lower cache profile weight.

* * * * *